United States Patent [19]

Winkelman

[11] Patent Number: 5,420,704
[45] Date of Patent: May 30, 1995

[54] METHOD AND APPARATUS FOR THE ANALYSIS OF COLOR CASTS IN COLOR ORIGINALS

[75] Inventor: Kurt-Helfried Winkelman, Kiel, Germany

[73] Assignee: Linotype-Hell AG, Eschborn, Germany

[21] Appl. No.: 306,428

[22] Filed: Sep. 19, 1994

Related U.S. Application Data

[63] Continuation of Ser. No. 43,221, Apr. 6, 1993, abandoned.

[30] Foreign Application Priority Data

Apr. 6, 1992 [DE] Germany .......... 42 11 452.7
Mar. 26, 1993 [DE] Germany .......... 43 09 877.0

[51] Int. Cl.⁶ ............................................. G03F 3/08
[52] U.S. Cl. ........................... 358/520; 358/518; 358/522
[58] Field of Search ............ 358/504, 520, 518, 523, 358/522, 524, 525, 530; 382/17

[56] References Cited

U.S. PATENT DOCUMENTS

| | | | |
|---|---|---|---|
| 4,745,465 | 5/1988 | Kwon | 358/522 |
| 4,958,217 | 9/1990 | Kimura et al. | 358/504 |
| 4,984,071 | 1/1991 | Yonezawa | 358/522 |
| 4,989,080 | 1/1991 | Ito | 358/520 |
| 5,220,620 | 6/1993 | Nakano et al. | 358/520 |
| 5,233,413 | 8/1993 | Fuchsberger | 358/518 |
| 5,299,291 | 3/1994 | Ruetz | 358/518 |
| 5,307,182 | 4/1994 | Malz | 358/518 |
| 5,335,097 | 8/1994 | Murakami | 358/520 |
| 5,343,311 | 8/1994 | Morag et al. | 358/518 |

*Primary Examiner*—Edward L. Coles, Sr.
*Assistant Examiner*—Fan Lee
*Attorney, Agent, or Firm*—Hill, Steadman & Simpson

[57] ABSTRACT

A method and apparatus for the analysis of a color cast in a color original to be reproduced, by evaluating color values acquired by point-by-point and line-by-line, trichromatic scanning with an image processing input device. For acquiring a color cast in the color original, a region of high luminance values (light image region) and/or a region of low luminance values (dark image region) of the luminance component L* of the color values L*, a*, b* in the color original to be analyzed is/are subdivided into at least one luminance region. The value of a potentially existing color cast in the luminance region is identified by averaging the color components a*, b* of the color values L*, a*, b* in the luminance region. The color cast value to be utilized for the evaluation of the color cast analysis is formed by selection and/or combination of color cast values identified for individual luminance regions. In addition, at least one luminance region is demarcated to form an analysis region in view of the chrominance c* by forming chrominance regions around the gray axis of the color space, whereby the demarcated analysis region is then utilized for calculating a potential color cast.

20 Claims, 4 Drawing Sheets

METHOD AND APPARATUS FOR THE ANALYSIS OF COLOR CASTS IN COLOR ORIGINALS

This is a continuation of application Ser. No. 08/043,221, filed Apr. 6, 1993, now abandoned.

BACKGROUND OF THE INVENTION

The invention generally relates to methods and apparatus for the electronic reproduction of an image. More specifically, the invention is directed to a method and to an apparatus for the analysis of color casts in color originals in apparatus and systems for electronic image processing. As is known, a color cast analysis of color originals is undertaken to acquire setting parameters for color cast correction of the color originals.

As used herein, the term "image original" refers to original images whether black and white or color. "Color original" refers to original images in color, e.g., color photographs.

As is known, electronic image processing essentially comprises the steps of image input, image processing and image output.

In the image input step utilizing, for example, a color image scanner (scanner) as an image input device, three primary color value signals R, G, B can be acquired by trichromatic as well as pixel-by-pixel and line-by-line scanning of color originals to be reproduced with an optoelectronic scanner element, whereby the individual color value triads represent the color components "red" (R), "green" (G) and "blue" (B) of the picture elements scanned in the color original. The analog color values are converted into digital color values and are stored for the subsequent image processing.

In the image processing step, the color values R, G, B are usually first converted into color separation values C, M, Y, K according to the regularities of subtractive color mixing, these color separation values being a measure for the dosages of the inks "cyan" (C), "magenta" (M), "yellow" (Y) and "black" (K) or, respectively, for the raster point sizes or raster percentages employed in a later printing process.

Over and above this, various image parameters such as light image values and dark image values for an adaptation of the image scope, color cast values for a correction of color cast as well as a corrected image gradation characteristic for a contrast correction or for a correction of over-exposures and under-exposures can be set. Further, local and selective color corrections can also be undertaken, with the object of improving the image reproduction, compensating deficiencies or undertaking editorial changes.

The setting of the image parameters by an operator usually begins with the operator first presetting standard values that he calculates based on a rough preclassification of the appertaining color original or based on an experienced guess. While setting the image parameters, the operator makes use of the measuring functions of the color image scanner in that he measures characteristic picture elements in the color original with the optoelectronic scanner element with respect to image scope, color cast and luminance distribution and employs the measured results for calculating optimum setting values.

After the image processing, the image output is produced with a suitable image output device, for example with a color separation recorder or printer for the rastered recording of color separations on a film material.

A color cast analysis in a color original and a color cast correction of the color original based on the analysis are required because the color original (usually a photographic reproduction of an original image) frequently has chromatic deviations when compared to the actual original image, these usually being exposure-conditioned and film-oriented errors. Further, with respect to color originals scanned with a color image scanner with basic settings, at least the coloring of the film carrier material is present in the resulting color values as an undesired color cast.

For correcting color cast, the operator must find the correct white point and black point in the color original by visual evaluation and must identify the color cast values on the basis of a color measurement. The interpretation of the measured results and their conversion into optimum setting values for the color cast correction require a great detail of experience and often represent difficulties for an unexperienced operator.

When chromatic errors of a color original are to be identified without the color sensation of an operator, an automatic color cast analysis must be implemented wherein the color information of the color original is evaluated and a decision is made based on specific, objective criteria as to whether there is a color cast or not. Since an automatic color cast analysis cannot provide any information about the theme of the image or, respectively, about how the image should actually look, statistical statements must be utilized as the criteria.

It is already known to undertake automatic color cast analyses of color originals by evaluating the color values of the color originals and to employ the results of the analysis for calculating image-dependent, pre-setting values for the color cast correction. The operator can evaluate the result of a color cast analysis and directly transfer the resulting pre-setting values into the image input device or can modify or, respectively, correct these on the basis of measurement functions in order to undertake an optimum setting. The operator is thus relieved of routine jobs or tasks and can concentrate on the processing of color originals wherein additional global or selective color corrections are required for improving the reproduction quality.

The known methods for the analysis of a color cast in a color original have the particular disadvantage that they do not allow any reliable identification of the optimum setting values for an optimally broad spectrum of color originals, so that no simple, fast and standardized parameterizations of image input devices are possible.

The known methods for color cast analysis are based on the color values R, G, B of a device-dependent RGB color space acquired by the respective image input device, whereby the analysis of the image scope and of the color cast is directly implemented with reference to the color values R, G, B, and whereas a luminance signal derived from the color values R, G, B is often employed for analysis of the image gradation.

A further disadvantage arises in that the known analysis methods must be specifically adapted to the properties of the color values R, G, B of the respective image input devices given the use or connection of different image input devices.

The known analysis methods, moreover, are calculation-intensive since the color values R, G, B acquired with the image input devices must first be resolved into color components for the analysis of a color cast and must also be additionally resolved into a luminance component for the analysis of image scope and image gradation.

SUMMARY OF THE INVENTION

According to the present invention, a method and apparatus is provided for analysis of a color cast in a color original to be reproduced for color image processing. Color values (L*, a*, b*) are acquired by point-by-point and line-by-line, trichromatic scanning of the color original with an image processing input apparatus. A value range of a luminance component (L*) of the color values (L*, a*, b*) is subdivided into luminance regions. The subdividing into luminance regions is undertaken in at least one of a light image region of relatively high luminance values and in a dark image region of relatively low luminance values. The luminance regions are additionally demarcated in view of hue by forming hue regions around a gray scale axis of a color space for analysis regions. The demarcated analysis regions are utilized for checking for potentially present color casts. A minimum plurality of color values (L*, a*, b*) to be evaluated are defined for identification of the color cast value and an analysis region. Given presence of a color cast in an analysis region, a determination is made as to whether a plurality of color values (L*, a*, b*) available in the analysis region is higher than the minimum plurality. The color cast value of the analysis region is only calculated when the plurality of color values (L*, a*, b*) available is higher than the minimum plurality. A color cast value to be utilized for evaluation of the color cast analysis is identified by at least one of selection or combination of color cast values calculated for the individual analysis regions.

In an embodiment of the invention, an analysis region provided for a light image region and an analysis region provided for a dark image region are demarcated and separate analyses of a potential color cast are undertaken for each analysis region.

In an embodiment of the invention, the luminance regions and chrominance regions are demarcated by luminance thresholds and chrominance thresholds.

In an embodiment of the invention, it is provided that the set of color values L*, a*, b* belonging to a luminance region are determined by comparing the luminance component L* of the color values L*, a*, b* of the color original to be analyzed to the identified luminance thresholds for the luminance region.

With respect to this last embodiment, it is advantageous in that
the chrominance is calculated from the color components a* and b* of the set of color values (L*, a*, b*) of the color original; and
the color values L*, a*, b* belonging to a chrominance region are identified by comparing the calculated chrominance to the identified chrominance thresholds for the chrominance region.

Chrominances (Cab) can be calculated from the color components a*, b* of the set of color values L*, a*, b* according to the equation:

$$cab = \sqrt{a^{*2} + b^{*2}}$$

It can also be provided that the color values L*, a*, b* of the color original to be analyzed are first checked for affiliation to a particular luminance region and are then checked with respect to the chrominance regions.

It has proven advantageous that a minimum plurality of color values L*, a*, b* to be evaluated is prescribed for the calculation of a color cast value in a light image region, in a dark image region or in an analysis region.

A minimum plurality for the light image region or, respectively, the dark image region is preferably selected in the value range from 5 through 15% of the total number of color values L*, a*, b* in the corresponding region.

It can also be provided that
a determination is first made in an analysis region to see whether a color cast is present or not;
an analysis region is left out of consideration for further processing when no color cast is identified thereof; and
an analysis region will be subject to continued investigation when a color cast is identified therefor.

In a preferred embodiment of the invention, the identification of a potentially existing color cast in an analysis region takes place by separately accumulating or summing together the color components a*, b* of the set of color values L*, a*, b* of an analysis region, whereby no color cast is present when the sum is equal to zero and a color cast is present when the sum is not equal to zero.

Advantageously, given the presence of a color cast in an analysis region, an identification is made as to whether the plurality of color values L*, a*, b* available in this analysis region is greater than a defined minimum plurality or not. When the plurality of color values L*, a*, b* available in an analysis region is greater than the defined minimum plurality, the color cast value of the analysis region is calculated.

In an embodiment of the invention, the color cast value of an analysis region is calculated as the mean deviation from achromatic, such that an accumulation or summation $\Sigma a^*$, $\Sigma b^*$ of the color components a*,b* of the color values L*, a*, b* are divided by the plurality of existing color values L*, a*, b* in the appertaining analysis region.

In a preferred embodiment of the invention,
when the plurality of color values L*, a*, b* available in an analysis region is smaller than the defined minimum plurality, the relevant analysis region is combined with an adjoining analysis region to form an enlarged analysis region;
the new plurality of color values L*, a*, b* of the enlarged analysis region are available is respectively identified and compared to the defined minimum plurality;
the accumulated color components $\Sigma a^*$, $\Sigma b^*$ of the enlarged analysis region are respectively identified;
the combination of adjoining analysis regions is continued until the new plurality of color values L*, a*, b* is greater than the defined minimum plurality; and
the potentially existing color cast value of the correspondingly enlarged analysis region is then calculated.

In a preferred embodiment of the invention, the sizing of the luminance regions and/or chrominance regions are respectively selected dependent on the properties of the color original to be analyzed.

In this regard, it has proven advantageous to select the size of the luminance regions depending on the respective luminance scope of the color original.

It also has proven useful to select the size of the luminance regions depending on the curve of the frequency distribution (histogram) of the luminance component L* of the color values L*, a*, b*.

In a preferred embodiment of the invention, in the color cast correction, the color cast value provides a partial color correction, whereby the degree of the color cast partial correction defined by a partial correction factor.

In that regard, the alleviation factor advantageously is defined according to a classification strategy depending on the evaluation region and/or the strength of the analyzed color cast values.

In a preferred embodiment of the invention, the color values R, G, B of a first color space allocated to the input device are transformed into the color values L*, a*, b* of a second color space that is independent of the first color space; and the analysis of a color cast in a color original for calculating setting values for the color image processing is undertaken with reference to the transformed color values L*, a*, b* of the second color space.

In an embodiment, the invention provides an apparatus for the analysis of a color cast in a color original to be reproduced, comprising:

at least one image input device;

a color converter connected to the at least one input devices, the color converting color values R, G, B of a first color space allocated to the at least one input device into color values L*, a*, b* of a second color space that is independent of the first color space;

an image processing unit connected to the color converter for processing the transformed color values L*, a*, b*;

a communication unit for the intermediate storage of the processed color values L*, a*, b* coupled to the image processing unit;

a master analysis unit connected to the image processing unit and to the color converter with which the analysis of a potential color cast in a color original for identifying setting values for the color image processing is implemented on the basis of the transformed color values L*, a*, b* of the second color space; and an operating terminal coupled to the master analysis unit and the image processing unit.

These and other features of the invention are discussed in greater detail below in the following detailed description of the presently preferred embodiments with reference to the accompanying drawings.

DETAILED DESCRIPTION OF THE PRESENTLY PREFERRED EMBODIMENT

This application claims priority to German Patent Application Serial No. P42 11 452.7 filed Apr. 6, 1992, and German continuation application Serial No. P 43 09 877.0 filed Mar. 26, 1993, the disclosures of which are fully incorporated herein by reference, to the extent necessary and not already presented herein.

Figure 1:
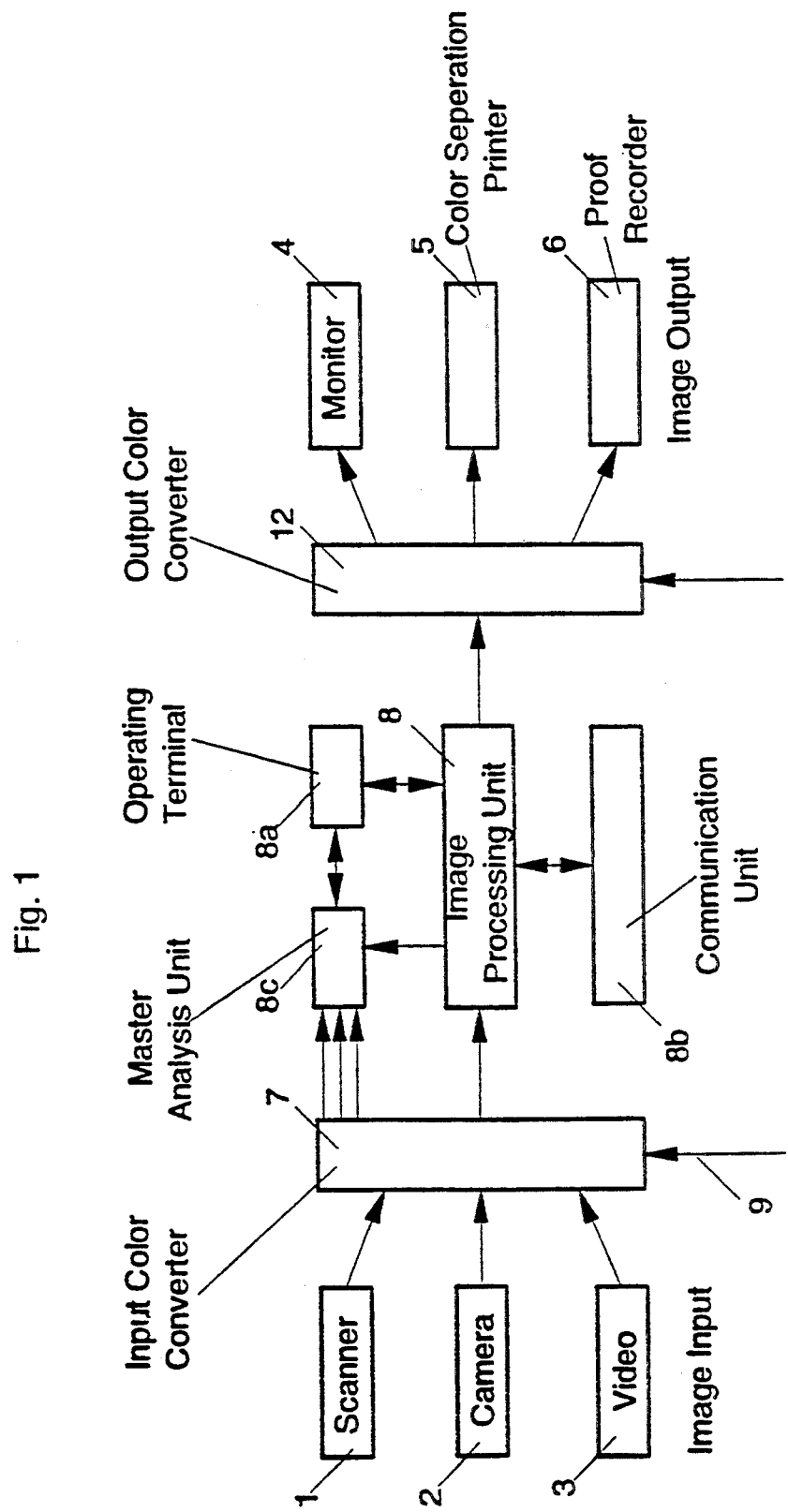
FIG. 1 illustrates a schematic diagram of a color image processing system.

FIG. 1 illustrates a schematic diagram of a structure of a color image processing system. Input devices that scan point-by-point and line-by-line are represented by a scanner 1; devices that scan planarly are represented by a camera 2; and devices for generating colored graphic data such as, for example, graphic design stations are represented by a video input 3. Various output devices are represented by a monitor 4, a color separation recorder 5 and a proof recorder 6.

The color values R, G, B of the respective device-dependent color space produced in the input devices 1, 2 and 3 are converted by an input color converter 7 into color values of a device-independent communication color space and are supplied to an image processing unit 8. The color conversion from the device-dependent color space into the communication color space is effected via a reference color system.

The input color converter 7, for example, is constructed as a memory table LUT wherein the output color values are addressably stored to be addressable by the appertaining input color values. The value table is input into the input color converter 7 via an input 9. In addition, an input calibration is implemented in the color conversion. As shown in FIG. 1, the input color converter 7 can be a separate unit or can be a component part of an input device 1, 2 or 3 or of the image processing unit 8.

The color corrections and geometric processings desired by an operator are implemented in the image processing unit 8 with reference to the transformed color values of the respectively employed communication color space. To that end, the image processing unit 8 is connected to an operating terminal 8a for the operator. Further, the image processing unit 8 is in communication with the communication unit 8b wherein the color values to be processed are intermediately stored.

Further, a master analysis unit 8c is provided that is connected to the image processing unit 8 and to the operating terminal 8a. A preselection can be undertaken by programming inputs of the master analysis unit 8c as to whether the master analysis is to ensue with respect to a potentially existing color cast in a color original—as in the present case—or, on the other hand, with respect to the image scope of the color original and/or the image gradation in the color original.

Before the master analysis is undertaken, the color original to be analyzed is scanned point-by-point and line-by-line in the scanner 1 with a resolution (coarse scan) coarser than the resolution required for the actual reproduction (fine scan). The color values R, G, B thereby acquired are digitized, potentially pre-distorted according to a prescribed function (e.g., a Munsell function), converted in the color converter 7 into the color values of the selected communication color space 15, for example into the color values L*, a*, b*, and, finally, stored in the communication unit 8b.

Subsequently, the color values L*, a*, b* of the coarse scan are loaded into the master analysis unit 8c and are investigated therein with respect to a color cast according to mathematical and statistical methods, which are set forth in detail below.

Image-dependent pre-setting values are derived from the results of the color cast analysis, these pre-setting values being forwarded to the operating terminal 8a for color cast correction. The operator can directly transfer the resulting pre-setting values into the image processing unit 8 for image setting Or can modify or, respectively, correct them in order to achieve an optimum setting. The analysis result can thereby be displayed, further image corrections can be implemented and the settings found to be optimum can be stored for the following scanning of the color original with high resolution (fine scanning).

After the image processing, the processed color values are read out from the image processing unit 8 and are converted into process color values in an output color converter 12 on the basis of an output color transformation, these process color values being supplied to the corresponding output devices 4, 5 and 6. A corresponding output calibration thereby occurs.

Figure 2:
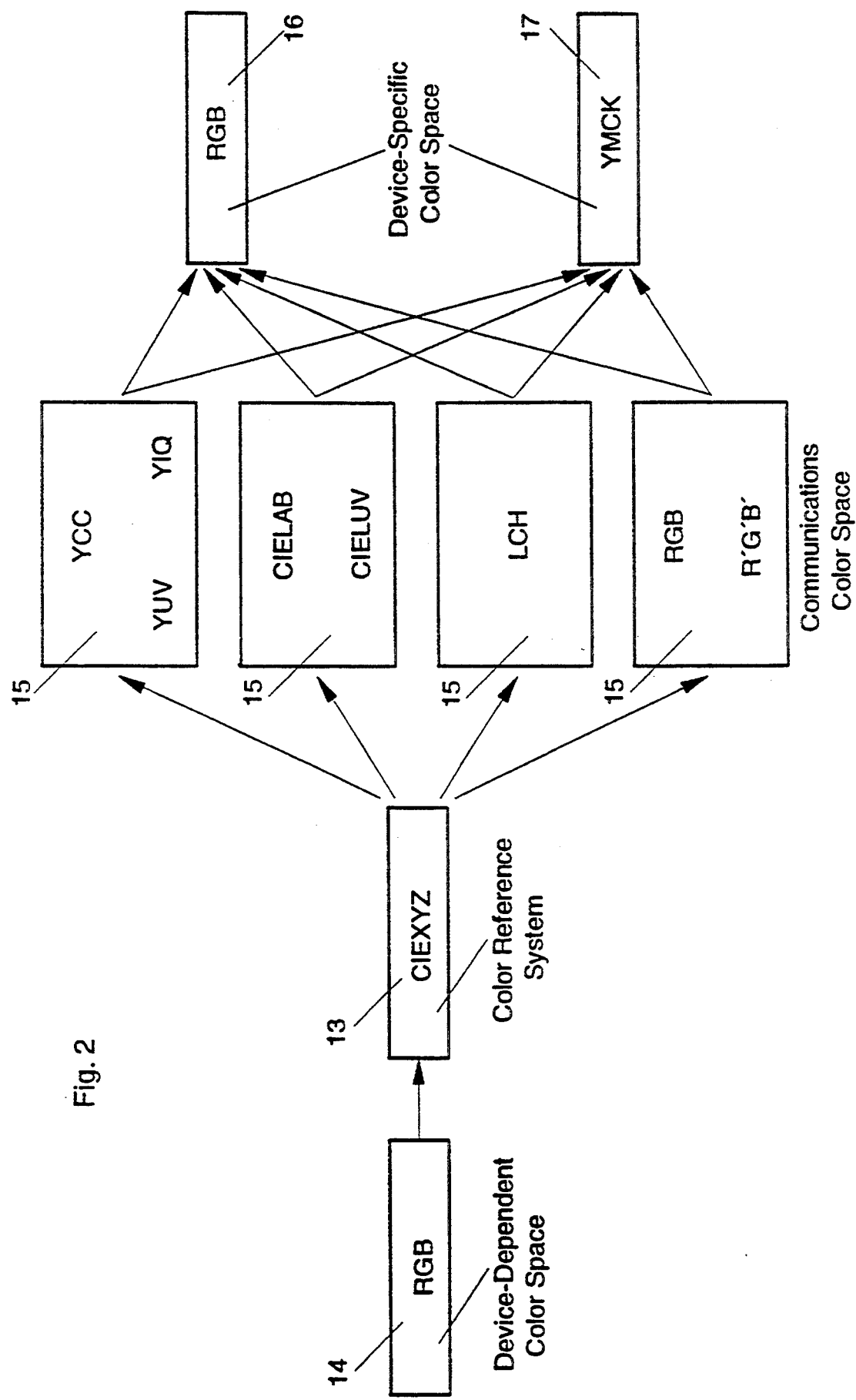
FIG. 2 illustrates a block diagram of a communication model for a color image processing system.
Figure 3:
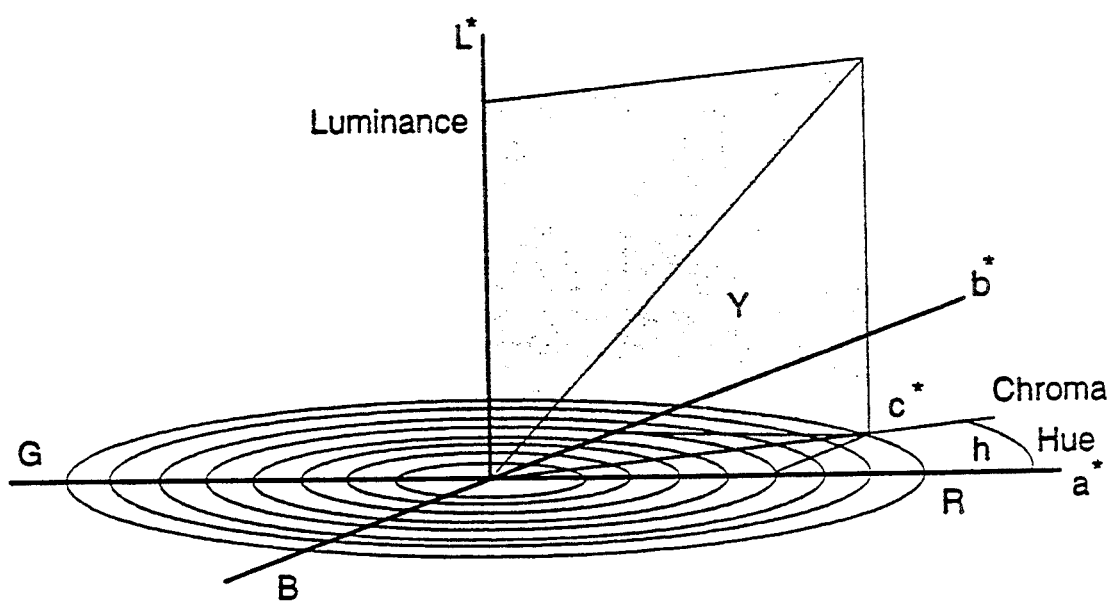
FIG. 3 illustrates a graph of a CIELAB color space.

FIG. 2 illustrates a block diagram of a communication model for a color image processing system. The XYZ color value system (CIEXYZ) standardized by the Commission Internationale de l'Eclairage (CIE) [International Commission on Illumination] can serve as the reference color system 13, this system being based on the visual properties of the human eye. The color values R, G, B of the device-specific RGB color space 14 of the input devices 1, 2 and 3 are transformed into the reference color system 13 by an input calibration. The color values X, Y and Z of the reference color system 13 are transformed by mathematically defined transformations into color values of a selectable, device-independent communication color space 15 with which the master analysis and the image processing ensue. Advantageously, the communication color spaces 15 conforming to sensation, preferably the CIELAB color space that is illustrated in greater detail in FIG. 3, is employed for the master analysis. After the image processing, the transformation of the processed color values of the appertaining communication color space 15 into the process color values of the device-specific RGB color space 16 or, respectively, CMYK color space 17 of the output devices 4, 5 and 6 ensues.

FIG. 3 illustrates the CIE 1976 L*a*b* color space—referred to in brief as CIELAB color space—that is constructed equidistantly approximately in conformity with sensation. The Cartesian coordinates of the CIELAB color space are allocated to the sensation-conforming quantities of luminance L* (lightness), red-green chrominance a* (R-G) and yellow-blue chrominance b* (B-Y). The value range of the luminance L* extends from 100 for reference white to 0 for the absolute black. The value range of the chrominances a* and b* for colors emanating from an illuminated subject (non-self-luminance perceived colors) extends from approximately −80 through approximately +120. The reference white and the absolute black have a chrominance of zero. The derived quantities of "overall" chrominance c* (chroma) and color shade angle h (hue) can be calculated from the ab* chrominances. The value range of the chrominance c* lies between 0 (neutral or gray) and approximately +120. The color shade angle h lies between 0 and 360 degrees with reference to the positive a* axis.

The method for the analysis of color casts in color originals shall be set forth in detail below.

It can be appreciated that although the following description is provided with reference to the example using the color values L*, a*, b* of the CIELAB color space, of course, the color values of some other, suitable color space (see, for example, FIG. 2; color space 15) can also be utilized.

For color cast analysis, the luminance scope of the color original to be investigated is first subdivided into a region of high luminance values (light image region) and into a region of low luminance values (dark image region) of the luminance component L* of the color values and the potentially existing color casts in the two regions are separately analyzed.

It has proven expedient for a reliable identification of a color cast to subdivide the light image region and/or the dark image region into at least two luminance regions BL and BT and to separately evaluate both the individual luminance regions BL of the light image region as well as the individual luminance regions BT of the dark image regions separately with respect to a potentially existing color cast.

It has also proven advantageous to additionally demarcate the luminance regions BL and BT into respectively at least two chrominance regions BC with respect to the chrominance c*, as a result whereof the color values to be investigated can be classified into more neutral (gray) values and more chromatic values. The color cast analysis is thereby limited to slightly chromatic values, whereas all chromatic image details are excluded from the color cast analysis. Demarcated analysis regions BLC or, respectively, BTC that are separately investigated arise in this way in the color space with respect to luminance and chrominance.

The demarcation of the luminance regions BL in the light image region and of the luminance regions BT in the dark image region ensues on the basis of luminance thresholds SwL or, respectively, SwT, and the demarcation of the chrominance regions BC ensues on the basis of corresponding chrominance thresholds SwC.

The luminance regions BL and BT can be selected to be of the same size or of different sizes.

Since the color cast analysis can only supply valid results when the plurality of color values to be evaluated is adequately great in the demarcated analysis regions BLC or, respectively, BTC, it proves advantageous to select the size of the luminance regions BL and BT respectively dependent on the original, i.e. dependent on the respective scope of luminance of the color original to be analyzed, which is to be set forth below.

The chrominance regions BC can likewise be selected to be of the same size or of different sizes. It can thereby also prove advantageous to make the size of the chrominance regions BC dependent on the properties of the respective color original.

Figure 4:
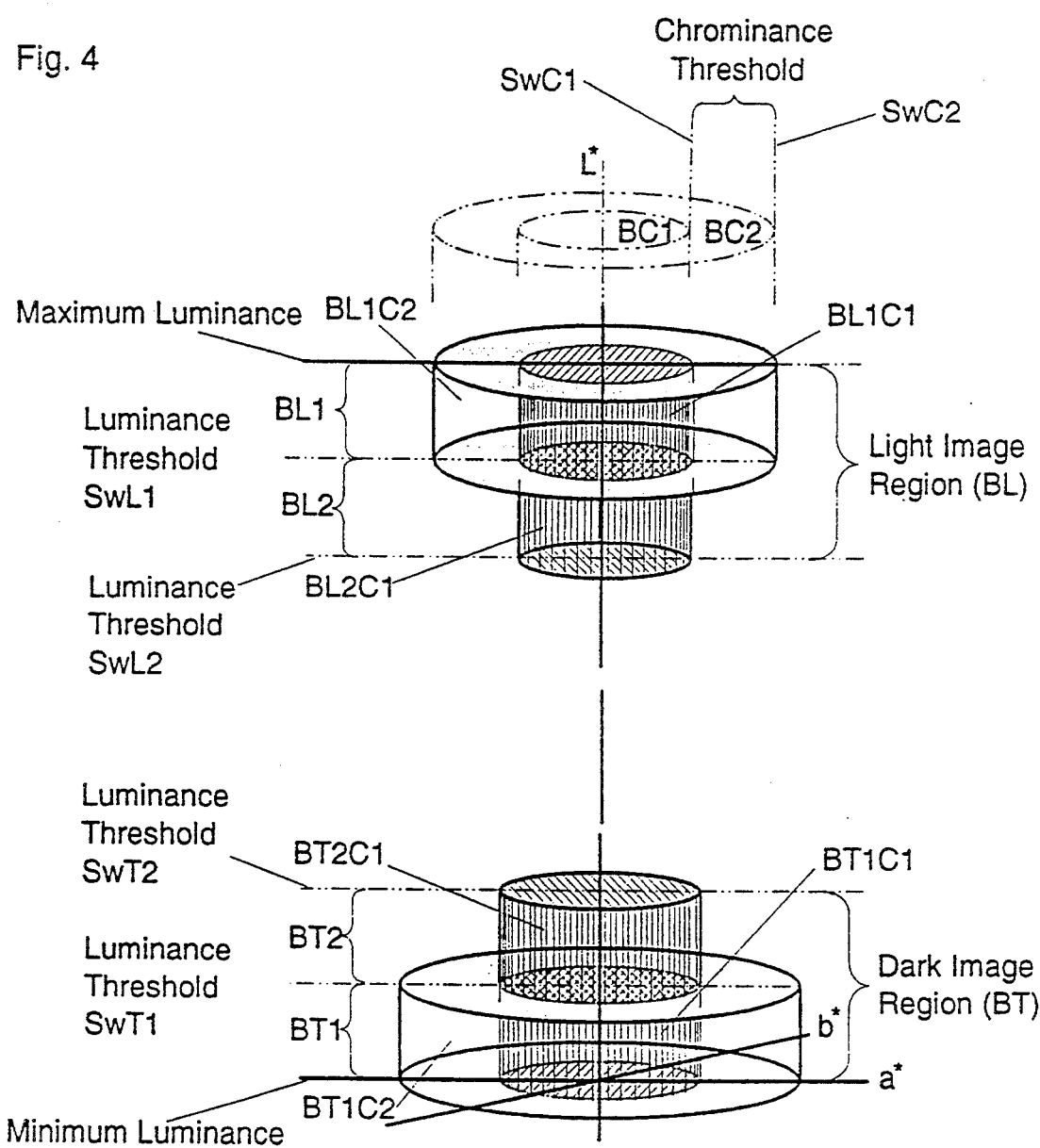
FIG. 4 illustrates a L*, a*, b* color space having subdivided luminance regions and chrominance regions.

FIG. 4 illustrates an L*, a*, b* color space with a subdivision of the light image region and of the dark image region into luminance regions BL and BT and chrominance regions BC. In the illustrated example, the light image region and the dark image region are respectively subdivided by luminance thresholds SwL1, SwL2 or, respectively, SwT1, SwT2 into respectively two luminance regions BL1 and BL2 or, respectively, BT1 and BT2. The analysis-regions BL1C1, BL1C2 and BL2C1 in the light image region and the analysis regions BT1C1, BT1C2 and BT2C1 in the dark image region arise by an additional demarcation of the luminance regions BL1 and BL2 or, respectively, BT1 and BT2 on the basis of chrominance thresholds SwC1 and SwC2 in the chrominance regions BC1 and BC2.

After the configuration of the luminance regions or, respectively, analysis regions given additional demarcation of the luminance regions with respect to the chrominance thereof, the region-by-region evaluation of the color values of the color original to be analyzed that belong to the individual regions ensues, namely according to the same criteria in the light image region and in the dark image region.

Since, as already mentioned, the color cast analysis only supplies valid results when the plurality of color values to be evaluated is adequately large in a luminance region. BL or, respectively, BT, a minimum plurality of color values to be evaluated for the color cast identification is first defined either per luminance region BL or, respectively, BT or per light image region or, respectively, dark image region. For example, approximately 10% of the total number of color values in the light image region or, respectively, dark image region is prescribed as minimum plurality of color values for the calculation of the average color cage.

Before the actual evaluation of an analysis region BLC or, respectively, BTC, the affiliation of the color values L*, a*, b* of the color original to be analyzed to a selected analysis region BLC or, respectively, BTC must be identified. To that end, the color values L*, a*, b* are recalled in and the luminance component L* of every color value L*, a*, b* that is recalled in is first investigated by comparison to the defined luminance thresholds SwL1, SwL2, SwT1 and SwT2 to see whether it falls within the selected luminance region BL1, B12, BT1 or BT2 or not. When the luminance component L* of a color value L*, a*, b* falls into the selected luminance region, the chrominance Cab is first calculated from the appertaining color components a* and b* of the color value L*, a*, b* and the calculated chrominance Cab is then additionally investigated with respect to the chrominance demarcation by comparison to the defined chrominance thresholds SwC1 and SwC2. The calculation of the chrominance ensues according to the equation:

$$Cab = \sqrt{a^{*2} + b^{*2}}$$

When the calculated chrominance Cab of the color value L*, a*, b* falls into the chrominance region BC1 or BC2, this color value L*, a*, b* is utilized for the identification of a potential color cast; otherwise, it is not evaluated further.

After this investigation, all color values L*, a*, b* belonging to the selected analysis region BLC have been determined, these color values being further interpreted in the following way.

A check is first carried out with reference to these color values L*, a*, b* to see whether a color cast is present in the selected analysis region BLC or, respectively, BTC.

The identification of a potential color cast ensues by separate accumulation of the color components a* and b*. When the two sums Σa* and Σb* are equal to zero, no color cast is present. When sums differing from zero result, the color original is classified as having a color cast in the respective analysis region BLC or, respectively, BTC.

When it turns out that no color cast is present, the color values L*, a*, b* of the selected analysis region BLC or, respectively, BTC are not investigated further.

When, by contrast, it turns out that a color cast is present, the color values L*, a*, b* are checked to see whether the plurality of color values L*, a*, b* available for the selected analysis region BLC or, respectively, BTC is greater than the defined minimum plurality.

When the plurality of color values L*, a*, b* available for the selected analysis region BLC or, respectively, BTC is greater than the defined minimum plurality, the value of the existing color cast for the selected analysis region BLC or, respectively, BTC is defined as an average deviation of the color values from achromatic, in that the accumulated color components Σa* and Σb* are divided by the plurality of existing color values L* a* b*.

The color cast values can be calculated in this way for the individual analysis regions BLC or, respectively, BTC, whereby the color cast value to be utilized for color cast correction is selected from the color cast values identified for the individual analysis regions BLC or, respectively, BTC.

An advantageous alternative is comprised therein that analysis regions BLC or, respectively, BTC are combined and the color cast values for the combined analysis regions BLC or, respectively, BTC are utilized for the color cast correction. In this case, one proceeds as follows.

When it turns out that a color cast is in fact present in the selected analysis region BLC or, respectively, BTC but that the plurality of color values L*, a*, b* to be evaluated is too low, at least one adjoining analysis region BLC or, respectively, BTC is added and an enlarged analysis region is formed. The plurality of color values to be evaluated for the enlarged analysis region results from the addition of the color values L*, a*, b* available in the two analysis regions BLC or, respectively, BTC. When the minimum plurality of color values L*, a*, b* is then achieved, the color cast of the enlarged analysis region is defined by averaging the accumulated sums Σa* and Σb* of both analysis regions BLC or, respectively, BTC. Otherwise, a further analysis region BLC or, respectively, BTC is added for evaluation.

The calculation of the average color cast from the analysis regions BL1C1, BL1C2 and BL2C1 of the light image region is carried out in the following way in the examples shown in FIG. 4.

The examination is expediently begun in the analysis region having the brightest luminance and the lowest chrominance, i.e. with the analysis region BL1C1 in the example herein.

When the plurality of color values L*, a*, b* in the analysis region L1C1 is greater than the prescribed minimum plurality, then the average color cast is defined from the analysis region L1C1 (this is known as Color Cast Evaluation Region BL1S1 as set forth in the classification pattern table set forth hereafter). Otherwise, the accumulated color components Σa* and Σb* and the plurality of color values from the analysis regions BL1C1 and BL1C2 are added. When the plurality of color values L*, a*, b* from the combined analysis regions BL1C1 and BL1C2 is greater than the prescribed minimum plurality, then the average color cast is determined from the analysis regions BL1C1 and BL1C2 (BL1S2 in the classification pattern table). Otherwise, the accumulated color components Σa* and Σb* and the plurality of color values L*, a*, b* from the analysis regions BL1C1, BL1C2 and BL2C1 are added. When the plurality of color values L*, a*, b* from the combined analysis regions BL1C1, BL1C2 and BL2C1 is greater than the prescribed minimum plurality, then the average color cast is determined from the analysis regions BL1C1, BL1C2 and BL2C1 (BL1S3 in the classification pattern table). Otherwise, a color cast cannot be analyzed and a color cast correction is not implemented for the color original.

The determination of the average color cast in the dark image region ensues analogously with an analysis of the regions BT1C1, BT1C2 and BT2C1.

The color cast values to be utilized for the evaluation of the color cast analysis can thus be formed by selection of color cast values identified for the individual analysis regions BLC or, respectively, BTC and/or by combination of identified color cast values.

The analyzed color cast values, as color components a* and b*, are the prescribed values for the color cast correction.

The course of the ab* color cast over the entire luminance scope can be approximately identified from the analyzed color cast values in the light image regions and dark image region. Since the average hue region is not analyzed with respect to the color cast, a linear color cast curve is assumed between light image region and dark image region.

The actual color cast correction in color originals ensues with reference to setting values calculated from the analysis results for the input devices 1, 2, 3 of FIG. 1, for example in a color scanner. Such a color cast correction is disclosed, for example, in German Patent No. DE-C-25 45 961, having counterpart U.S. Pat. No. 4,136,360, both of which are incorporated herein by reference. A color cast therein is respectively completely corrected by setting the color signal level. Often, however, it proves advantageous to implement only a partial compensation of color casts.

The extent of the color cast correction can be defined with a parameter for color cast partial compensation, this being defined between a minimum and a maximum color cast correction (for example, greater than zero=color cast partial compensation or correction; zero=color cast is preserved; color cast alleviation 10=complete compensation of color cast).

Given color originals having a normal color cast, generally only a partial color cast correction is generally implemented on the basis of an average value of the color cast alleviation.

A prescribed value for the color cast alleviation is determined for the analyzed color cast in the evaluation of the analysis data. The prescribed value is thereby determined dependent on the reliability of the analyzed color cast values. Given the selection of analysis regions BLC shown in FIG. 4, the result of the color cast analysis from a small analysis region (for example BL1C1) is more reliable than the result from a larger analysis region BLC. The strength of a color cast is also affected by a certain uncertainty. Small color casts are more probable than larger color casts.

The image-dependent definition of the color cast alleviation therefore expediently ensues dependent on the evaluation region (see previous definitions of BL1S1, BL1S2 and BL1S3) and on the degree of the analyzed color cast, for example according to the following classification pattern:

| Color Cast Evaluation Regions | | | Degree of the Analyzed |
|---|---|---|---|
| BL1S1 | BL1S2 | BL1S3 | Color Cast |
| 8 | 6 | 4 | weak |
| 6 | 5 | 3 | moderate |
| 4 | 3 | 2 | strong |

A prescribed value for the parameter of color cast alleviation for the analyzed color cast value derives as a result of this classification. Depending on the type of original (opaque/transparent), different parameter values are prescribed in the classification pattern.

An example of the use of the above set forth table is as follows. As shown in the table, the calculated color cast values can be classified into "weak", "moderate", and "strong" with the assistance of thresholds according to the classification strategy. The numerical values allocated to the "color cast evaluation regions" BL1S1, BL1S2, and BL1S3 are color cast alleviation values that determine the degree of color cast correction. The color cast alleviation values recited in the classification strategy are emperical values from practice. When, for example, a calculated color cast value is classified "moderate" and the color cast value is identified from the "color cast evaluation region" BL1S2, a color cast alleviation value of "5" derives according to the classification table.

The evaluation of the color cast analysis supplies the average color cast of the color original in the light image region and in the dark image region as ab* color cast values.

a*—color cast values in the light image region=AFstL b*—color cast values in the light image region=BFstL a*—color cast values in the dark image region=AFstT b*—color cast values in the dark image region=BFstT The prescribed values FstMinL and FstMinT for the color cast alleviation in the light image region and in the dark image region determine the extent of the color cast correction, for example in the value range 0 through 10.

The corrected a*b* color cast values AFstKorL and BFstKorL can be calculated as prescribed values for a color cast correction in the light image region and the corrected ab* color cast values AFstKorT and BFstKorT can be calculated as prescribed values for a color cast correction in the dark image region, being calculated therefrom as follows.

AFstKorL=AFstL * (1.0−FstMinL/10) for light image region

BFstKorL=BFstL * (1.0−FstMinL/10) for light image region

AFstKorT=AFstT * (1.0−FstMinT/10) for dark image region

BFstKorT=BFstT * (1.0−FstMinT/10) for dark image region.

The image-dependent determination of the luminance regions shall be set forth in greater detail below.

As already mentioned above, an optimally great plurality of image values must be evaluated for the identification of the average color cast. To keep component outlay to a minimum, however, the plurality should also not be excessively great.

The determination of the brightness regions ensues dependent on the course of the frequency distribution (histogram) of the luminance component L* of the color values L*, a*, b*. The luminance histogram is calculated in a preferred, separate analysis of the color original or is taken from a previously implemented analysis of the image scope.

An example for the calculation of the luminance thresholds SwL of the luminance regions BL in the light image region is set forth with reference to FIG. 5.

Figure 5:
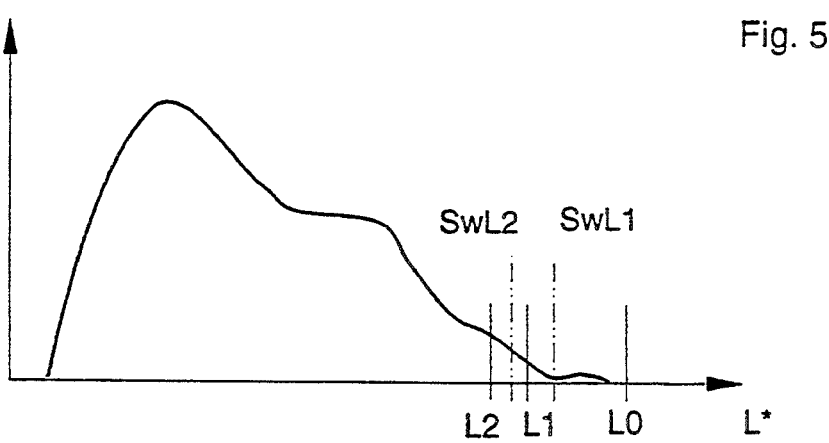
FIG. 5 illustrates a histogram curve.

FIG. 5 shows a typical histogram curve with definitions for the luminance thresholds SwL1 and SwL2 for the luminance regions BL1 and BL2 according to FIG.

4. The curve of the luminance distribution in the light image region is described by a shape factor cL. The calculation of the shape factor cL ensues via luminance values as check points (quantities) L0, L1, L2 in the histogram. Proceeding from the maximum image value, the frequency values of the histogram are accumulated for calculating the check points L0, L1, L2 and those luminance values $L_i$ at which prescribed frequency thresholds are upwardly transgressed are thereby identified.

The shape factor cL is calculated from the relative position of the check points relative to one another, for example from the following relationship:

$$cL = (L1 - L2)/(L0 - L2)$$

The shape factor cL can thereby assume values between 0.0 and 10.0.

The luminance thresholds SwL1 and SwL2 for the determination of the two luminance regions BL1 and BL2 are defined in the following way depending on the shape factor cL between the check points L0 and L1 or, respectively, L1 and L2:

$$SwL1 = (1-cL) * L1 + cL * L0$$

$$SwL2 = (1-cL) * L1 + cL * L2$$

The calculation of the luminance thresholds SwT1 and SwT2 for the dark image region is analogously implemented.

The luminance thresholds SwT1 and SwT2 for the definition of the two luminance regions BT1 and BT2 are determined depending on the shape factor cT between the check points T0 and T1 or, respectively, T1 and T2, whereby the frequency thresholds for the check points in the dark image region can be prescribed to be larger.

$$SwT1 = (1-cT) * T0 + cT * T1$$

$$SwT2 = (1-cT) * T1 + cT * T2$$

Although modifications and changes may be suggested by those skilled in the art, it is the intention of the inventors to embody within the patent warranted hereon all changes and modifications as reasonably and properly come within the scope of their contribution to the art.

I claim:

1. A method for correction of a color cast in a color original to be reproduced for color image processing, comprising the steps of:
    acquiring color values L*, a*, b* by point-by-point and line-by-line, trichromatic scanning of the color original with an image processing input apparatus;
    subdividing a value range of a luminance component L* of the color values L*, a*, b* into luminance regions;
    undertaking the subdividing into luminance regions in at least one of a light image region of relatively high luminance value and a dark image region of relatively low luminance value;
    additionally demarcating the luminance regions in view of chrominance by forming chrominance regions around a gray scale axis of a color space for analysis regions, and utilizing the analysis regions for checking for potentially present color casts;
    defining a minimum plurality of color values (L*, a*, b*) to be evaluated for identification of the color cast value in an analysis region;
    given presence of a color cast in an analysis region, making a determination as to whether a plurality of color values (L*, a*, b*) available in said analysis region is higher than said minimum plurality, and calculating the color cast value of the analysis region only when the plurality of color values (L*, a*, b*) available is higher than said minimum plurality;
    creating a characteristic final color cast value to be utilized for performing the color cast correction by at least one of selection or combination of the color cast values calculated for the individual analysis regions; and
    correcting the color values L*, a*, b* for color cast correction of the color original by use of the characteristic final color cast value.

2. A method according to claim 1 including the step of separately implementing the analysis of color cast in the analysis regions of the light image region and in the analysis regions of the dark image region.

3. A method according to claim 1 including the step of demarcating the luminance regions and the chrominance regions by thresholds.

4. A method according to claim 3 including the step of finding the color values (L*, a*, b*) belonging to a luminance region by comparing the luminance component (L*) of the color values (L*, a*, b*) of the color original to be analyzed to luminance thresholds for the corresponding luminance region.

5. A method according to claim 1, including the steps of:
    identifying values of the chrominance from the color components (a*, b*) of the color values (L*, a*, b*) of the color original to be analyzed; and
    determining the color values (L*, a*, b*) belonging to a chrominance region by comparing the chrominance values to a chrominance threshold for the corresponding chrominance region.

6. A method according to claim 5 including the step of calculating the chrominance values from the color components (a*, b*) of the color values (L*, a*, b*) according to the equation:

$$Cab = \sqrt{a^{*2} + b^{*2}}$$

7. A method according to claim 1 including the step of first checking the color values (L*, a*, b*) of the color original to be analyzed for affiliation to a luminance region, and then checking them with respect to the chrominance regions.

8. A method according to claim 1 including the step of determining a potentially present color cast in an analysis region by separate aggregation of the color components (a*, b*) of the color values (L*, a*, b*) of the corresponding analysis region so that no color cast is present in case sums ($\Sigma a^*$, $\Sigma b^*$) are unequal to zero.

9. A method according to claim 1 including the step of calculating the color cast value of an analysis region as an average deviation from achromatic by dividing accumulated color components ($\Sigma a^*$, $\Sigma b^*$) of the color values (L*, a*, b*) by a plurality of color values (L*, a*, b*) in the corresponding analysis region.

10. A method according to claim 1 including the further steps of:
   enlarging an analysis region by combining it with an adjoining analysis region when the plurality of color values (L*, a*, b*) available in the analysis region is lower than said defined minimum plurality;
   identifying a new plurality of color values (L*, a*, b*) of the enlarged analysis region respectively available and comparing the new plurality to the defined minimum plurality;
   respectively identifying accumulated color components ($\Sigma$a*, $\Sigma$b*) of the enlarged analysis region;
   continuing combining of analysis regions until a new plurality of color values (L*, a*, b*) for the combined regions is higher than the defined minimum plurality; and
   then calculating a color cast value of the correspondingly enlarged analysis region.

11. A method according to claim 1 wherein the minimum plurality of color values (L*, a*, b*) to be evaluated for the light image region or for the dark image region is selected in a value range from 5%–15% of a total number of color values (L*, a*, b*) in the corresponding region.

12. A method according to claim 1 wherein a size of the luminance regions or chrominance regions is selected dependent on properties of the color original to be analyzed.

13. A method according to claim 1 wherein a size of the luminance regions is selected dependent on a scope of luminance of the color original to be analyzed.

14. A method according to claim 1 wherein a size of the luminance regions is selected dependent on a curve of a frequency distribution histogram of the luminance component (L*) of the color values (L*, a*, b*).

15. A method according to claim 1 wherein the final characteristic color cast value created for a color original is employed to provide a partial color cast correction.

16. A method according to claim 1 including the step of utilizing the characteristic final color cast value to achieve only a partial color cast correction by defining a partial color correction factor to define an extend of the partial color cast correction according to a classification pattern dependent on at least one of an evaluation region and a strength of identified color cast values.

17. A method according to claim 1 including the steps of:
   transforming color values (R, G, B) of a first color space to be allocated to the input apparatus into functionally corresponding color values of a second color space as said color values (L*, a*, b*) that is independent of said first color space; and
   implementing a calculation of a potentially existing color cast in the color original to be analyzed for acquisition of setting values for color image processing based on the transformed color values (L*, a*, b*) of the second color space.

18. An apparatus for correction of a color cast in a color original to be reproduced for color image processing, comprising:
   means for acquiring color values L*, a*, b* by point-by-point and line-by-line trichromatic scanning of the color original with an image processing input apparatus;
   means for subdividing a value range of a luminance component L* of the color values L*, a*, b* into luminance regions;
   means for undertaking the subdividing into luminance regions in at least one of a light image region of relatively high luminance value and in a dark image region of relatively low luminance value;
   means for additionally demarcating the luminance regions in view of chrominance by forming chrominance regions around a gray scale axis of a color space for analysis regions and utilizing the analysis regions for checking for potentially present color casts;
   means for defining a minimum plurality of color values (L*, a*, b*) to be evaluated for identification of the color cast value in an analysis region;
   means for making a determination as to whether a plurality of color values (L*, a*, b*) available in said analysis region is higher than said minimum plurality given presence of a color cast in an analysis region, and for calculating the color cast value of the analysis region only when the plurality of color values (L*, a*, b*) available is higher than said minimum plurality;
   means for creating a characteristic final color cast value to be utilized for performing the color cast correction by at least one of selection or combination of the color cast values calculated for the individual analysis regions; and
   means for correcting the color values L*, a*, b* for color cast correction of the original by use of the characteristic final color cast value.

19. An apparatus according to claim 18 including
   an image processing unit for processing the color values (L*, a*, b*) comprising a control terminal and a communication unit for intermediate storage of the processed color values (L*, a*, b*); and
   an originals analysis unit connected to the image processing unit and to the control terminal for implementing analysis of a potential color cast in a color original for identification of setting values for the color image processing.

20. A method for correction of color cast in a color original to be reproduced, comprising the steps of:
   acquiring color values (L*, a*, b*) of the color original by point-by-point and line-by-line, trichromatic scanning of the color original with an image processing input device, each color value (L*, a*, b*) comprising a luminance component (L*) and color components (a*, b*) within a color space;
   subdividing a value range of said luminance component of said color values (L*, a*, b*) within at least one of a light image region representing relatively high luminance component values and a dark image region representing relatively low luminance component values into at least one luminance region;
   limiting said luminance region with respect to chrominance by at least one chrominance region around a gray axis of said color space to form an analysis region for analyzing a potential color cast;
   checking said analysis region with respect to a potential color cast;
   defining for said analysis region a minimum plurality of color values to be evaluated for calculating a color cast value of the potential color cast within said analysis region;

determining color values (L*, a*, b*) of said color original belonging to an analysis region if a color cast has been checked within an analysis region;

calculating the color cast value of said analysis region by averaging respective color components (a*, b*) only if the plurality of color values (L*, a*, b*) belonging to said analysis region is greater than the defined minimum plurality;

generating a characteristic final color cast value for interpretation of the color cast analysis of said color original by at least one of a selecting or combining of the calculated color cast values of analysis regions; and by use of the characteristic final color cast value.

* * * * *